US011501650B2

(12) United States Patent
Watanabe et al.

(10) Patent No.: US 11,501,650 B2
(45) Date of Patent: Nov. 15, 2022

(54) AVIATION WEATHER CONTROL SYSTEM

(71) Applicants: KABUSHIKI KAISHA TOSHIBA, Minato-ku (JP); Toshiba Infrastructure Systems & Solutions Corporation, Kawasaki (JP)

(72) Inventors: Takahiro Watanabe, Yokohama (JP); Kazuhiro Yoshimi, Tokyo (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 290 days.

(21) Appl. No.: 16/795,768

(22) Filed: Feb. 20, 2020

(65) Prior Publication Data

US 2020/0193848 A1    Jun. 18, 2020

Related U.S. Application Data

(63) Continuation of application No. PCT/JP2018/024044, filed on Jun. 25, 2018.

(30) Foreign Application Priority Data

Sep. 22, 2017 (JP) .............................. JP2017-182436

(51) Int. Cl.
*G08G 5/00* (2006.01)
*G01S 13/95* (2006.01)
(Continued)

(52) U.S. Cl.
CPC .......... *G08G 5/0091* (2013.01); *G01S 13/951* (2013.01); *G01W 1/10* (2013.01);
(Continued)

(58) Field of Classification Search
CPC .... G08G 5/0091; G08G 5/0026; G08G 5/003; G01S 13/951; G01W 2001/003; G01W 1/10; G01W 1/14
See application file for complete search history.

(56) References Cited

U.S. PATENT DOCUMENTS

| 5,657,009 A | 8/1997 | Gordon |
| 5,771,020 A | 6/1998 | Markson et al. |

(Continued)

FOREIGN PATENT DOCUMENTS

| CN | 103680215 A | 3/2014 |
| JP | 11-510252 A | 9/1999 |

(Continued)

OTHER PUBLICATIONS

International Preliminary Report on Patentability dated Feb. 26, 2020 in PCT/JP2018/024044 (with English translation), 7 pages.

(Continued)

*Primary Examiner* — Peter D Nolan
*Assistant Examiner* — Demetra R Smith-Stewart
(74) *Attorney, Agent, or Firm* — Maier & Maier, PLLC

(57) ABSTRACT

According to one embodiment, there is provided an aviation weather control system including: a processing unit configured to receive weather information of an area to be overseen including a vertically integrated liquid water content, and specify a weather phenomenon affecting an airplane based on the received weather information; and a notification unit configured to notify the weather phenomenon specified by the processing unit.

15 Claims, 5 Drawing Sheets

(51) Int. Cl.
  *G01W 1/10* (2006.01)
  *G01W 1/14* (2006.01)
  *G01W 1/00* (2006.01)

(52) U.S. Cl.
  CPC .............. *G01W 1/14* (2013.01); *G08G 5/003* (2013.01); *G08G 5/0026* (2013.01); *G01W 2001/003* (2013.01)

(56) References Cited

U.S. PATENT DOCUMENTS

| | | | |
|---|---|---|---|
| 7,558,674 B1* | 7/2009 | Neilley | G01W 1/02 702/3 |
| 2002/0039072 A1 | 4/2002 | Gremmert et al. | |
| 2002/0114517 A1 | 8/2002 | Wolfson et al. | |
| 2003/0156734 A1 | 8/2003 | Wolfson et al. | |
| 2004/0183695 A1 | 9/2004 | Ruokangas et al. | |
| 2004/0239550 A1* | 12/2004 | Daly, Jr. | G01S 13/953 342/26 B |
| 2010/0245464 A1* | 9/2010 | Maida | B41J 2/16552 347/28 |
| 2010/0245465 A1* | 9/2010 | Nakamura | B41J 2/16526 347/30 |
| 2012/0274484 A1* | 11/2012 | Zimmer | G08G 5/0013 340/945 |
| 2013/0226452 A1* | 8/2013 | Watts | G01C 21/3407 701/528 |
| 2016/0232796 A1 | 8/2016 | Oldach | |
| 2018/0149745 A1* | 5/2018 | Christianson | G01S 13/42 |
| 2018/0313975 A1* | 11/2018 | Chen | G01W 1/10 |

FOREIGN PATENT DOCUMENTS

| | | | | |
|---|---|---|---|---|
| JP | 2000-206245 A | 7/2000 | | |
| JP | 4226780 B2 * | 2/2009 | ............. | G01S 13/95 |
| JP | 2009-229131 A | 10/2009 | | |
| JP | 2014-41568 A | 3/2014 | | |
| JP | 2015-163858 A | 9/2015 | | |
| JP | 2017-157165 A | 9/2017 | | |
| JP | 2017-223627 A | 12/2017 | | |
| WO | WO-2014106268 A1 * | 7/2014 | ............. | B64D 15/00 |

OTHER PUBLICATIONS

Extended European Search Report dated May 26, 2021 in European Patent Application No. 18859029.3, 12 pages.
International Search Report dated Sep. 4, 2018 in PCT/JP2018/024044 filed Jun. 25, 2018, 1 page.

* cited by examiner

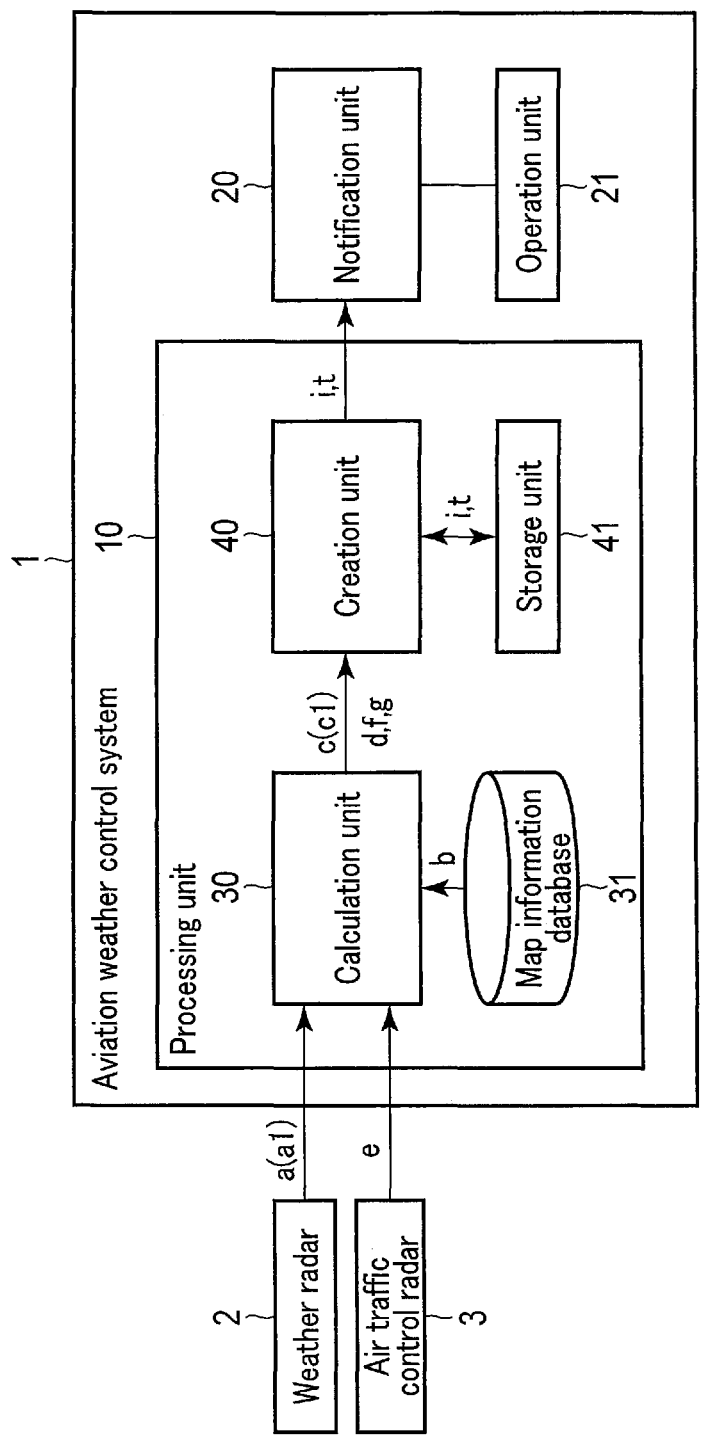
F I G. 1

| Scheduled takeoff time | Scheduled landing time | Airframe type | Core size (core diameter) |
|---|---|---|---|
| ⋮ | ⋮ | ⋮ | ⋮ |
| 13:10 | - | A | Equal to or greater than 3km |
| 13:16 | - | B | Equal to or greater than 4km |
| - | 13:25 | C | Equal to or greater than 2km |
| ⋮ | ⋮ | ⋮ | ⋮ |

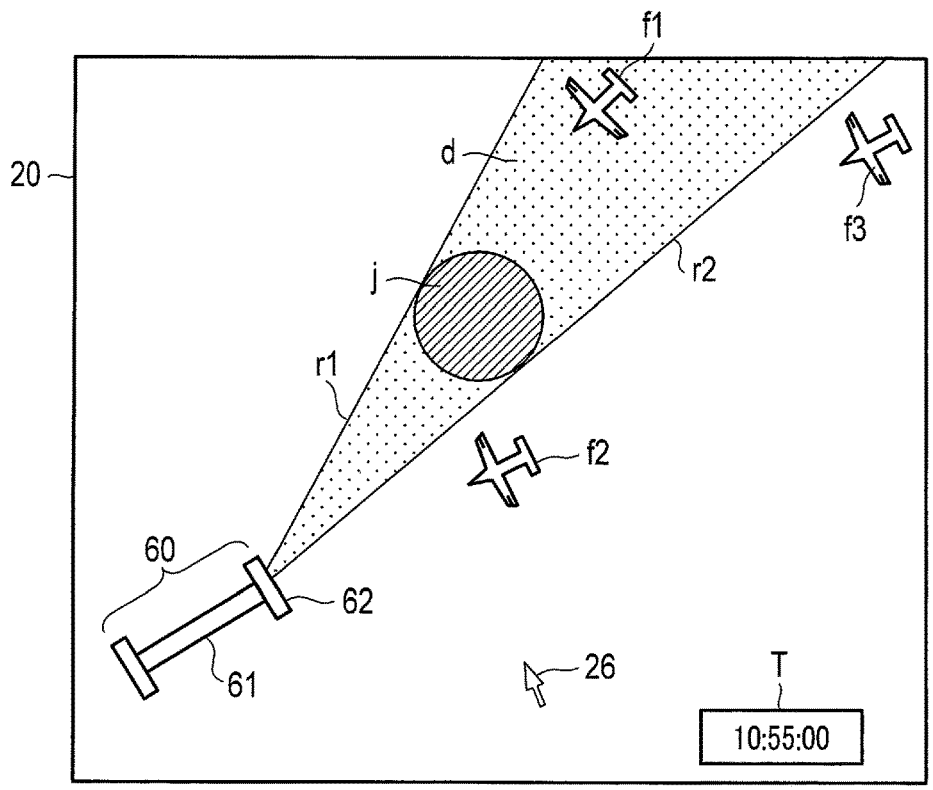
F I G. 6A
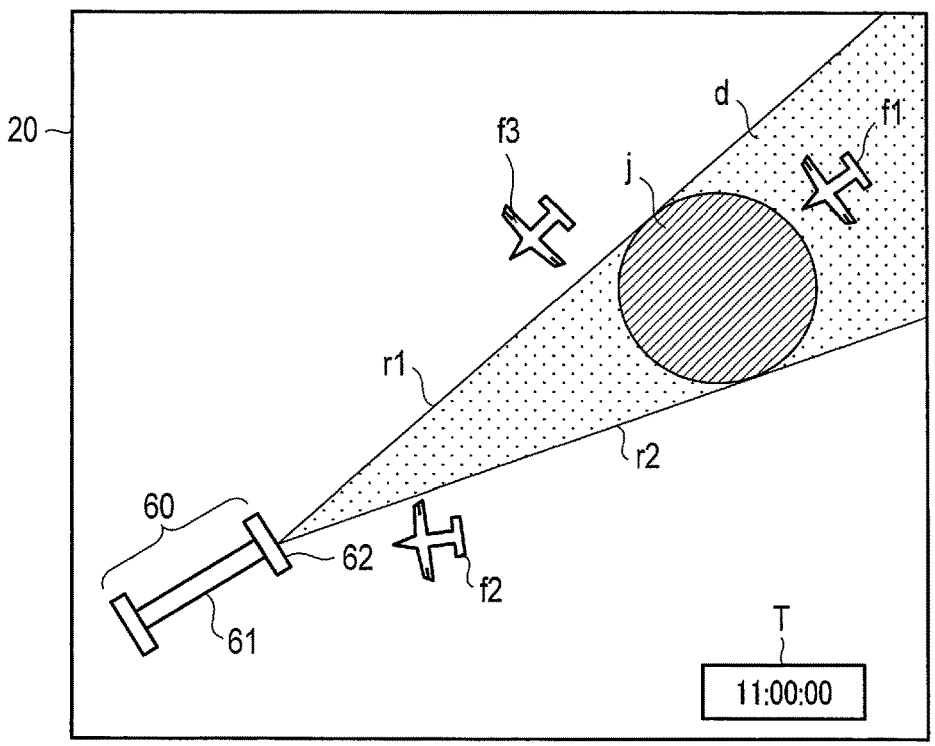
F I G. 6B

AVIATION WEATHER CONTROL SYSTEM

CROSS-REFERENCE TO RELATED APPLICATIONS

This application is a Continuation Application of PCT Application No. PCT/JP2018/024044, filed Jun. 25, 2018 and based upon and claiming the benefit of priority from Japanese Patent Application No. 2017-182436, filed Sep. 22, 2017, the entire contents of all of which are incorporated herein by reference.

FIELD

Embodiments described herein relate generally to an aviation weather control system.

BACKGROUND

Recent years have seen the frequent occurrence of torrential rain known as "guerrilla rainstorms." Sudden weather phenomena such as torrential rain may affect the operation of airplanes. It is therefore necessary for the air traffic controller to know about such sudden weather phenomena and accurately know the airplane affected by those weather phenomenon. On the other hand, it is difficult to predict such sudden weather phenomena, and it is necessary to accumulate knowledge and experience in order to instantaneously determine whether or not an airplane preparing for take-off and landing will be affected by such weather phenomena. There is thus a need for a system that can determine the airplane requiring attention without the need to depend on prior experience or place a burden upon the controller.

BRIEF DESCRIPTION OF THE DRAWINGS

FIG. 1 is a block diagram showing a configuration example of an aviation weather control system according to an embodiment.

FIG. 6A is a diagram in which time information is added to the notification example in FIG. 2A.

FIG. 6B is a diagram showing a notification example of a case where the core shown in FIG. 6A grows and moves to the right.

DETAILED DESCRIPTION

Figure 2A:
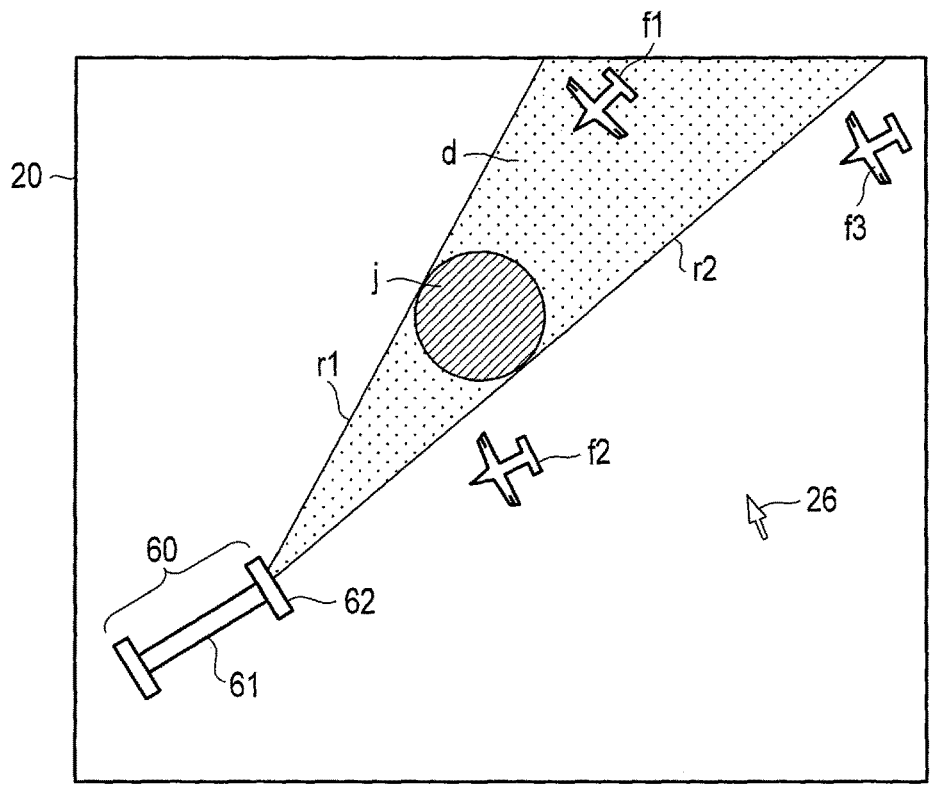
FIG. 2A is a diagram showing a notification example by the aviation weather control system according to the embodiment.

Hereinafter, an aviation weather control system of the present embodiment will be described with reference to the drawings.

According to an embodiment, an aviation weather control system includes: a processing unit configured to receive weather information of an area to be overseen including a vertically integrated liquid water content, and specify a weather phenomenon affecting an airplane based on the received weather information; and a notification unit configured to notify the weather phenomenon specified by the processing unit. The processing unit includes: means for determining a range affecting the airplane as a hazardous area if the weather phenomenon is specified, and for predicting the weather phenomenon affecting the airplane based on a positional relationship between the hazardous area when the weather information is obtained and the airplane; means for storing map information of the area to be overseen; and means for determining a heavy rain core based on the vertically integrated liquid water content, approximating the determined core to a spherical shape, and determining, as the hazardous area, a range which is inside tangent lines drawn to the core from an end of a runway on a side where the airplane either takes off or lands and within a certain distance from an airport provided with the runway. The notification unit notifying the hazardous area determined by the processing unit.

FIG. 1 is a block diagram showing a configuration example of an aviation weather control system 1 according to an embodiment of the present invention. The aviation weather control system 1 includes a processing unit 10, a notification unit 20, and an operation unit 21. The processing unit 10 further includes a calculation unit 30, a map information database 31, a creation unit 40, and a storage unit 41.

The calculation unit 30 receives weather information (a) from a weather radar 2 for observing weather phenomena. The type of weather radar 2 is not particularly limited, but a phased array weather radar is preferable. This is because the phased array weather radar has a smaller beam interval and a shorter observation period as compared with a conventional weather radar, which leads to little dependency on estimation and quick and fine data acquisition. Since the weather information (a) is automatically received at regular time intervals, the calculation unit 30 can always receive the latest weather information (a).

The map information database 31 stores at least map information (b) of a range overseen by the air traffic control radar 3.

The calculation unit 30 predicts a weather phenomenon (c) that affects an airplane based on the weather information (a). As the weather information (a) used for predicting the weather phenomenon (c), it is possible to use not only the latest weather information received from the weather radar 2 but also the weather information (a) received from the weather radar 2 in the past, as necessary.

Furthermore, the calculation unit 30 knows the position (c1) of the weather phenomenon (c) by using the map information (b) stored in the map information database 31. Then, based on the position of the airport and the position (c1) of the weather phenomenon (c), a hazardous area (d) in which the weather phenomenon (c) affects the airplane is predicted. Details of a method for predicting the hazardous area (d) will be described later with reference to FIG. 2A.

The weather phenomenon (c) affecting the airplane includes a downburst, a shear line, and torrential rain generally referred to as a "guerrilla rainstorm," for example. The weather phenomenon (c) may include natural phenomena which are considered to affect the flight of the airplane, such as ice accretion or volcanic ash (ash fall).

At the same time, the calculation unit 30 receives the takeoff/landing information (e) of the airplane located around the airport from the air traffic control radar 3. The takeoff/landing information (e) includes a position of the airplane, an altitude of the airplane, and a call sign for specifying the airplane, for example. Since the takeoff/landing information (e) is also automatically received at regular time intervals, the calculation unit 30 can receive the takeoff/landing information (e) updated to the latest status at all times when the airplane is in flight.

The takeoff/landing information (e) may not necessarily be received from the air traffic control radar 3, and may be stored in the processing unit 10.

A calculation unit 30 specifies an airplane (f) affected by the weather phenomenon (c) based on the hazardous area (d) and takeoff/landing information (e).

The calculation unit 30 predicts a flight route (g) of the airplane after a certain period of time. The flight route (g) may be predicted based on at least one of takeoff/landing information (e) received from the air traffic control radar 3, flight plan information (h) of the airplane received from the controller, and past similar data. In addition, the calculation unit 30 can also predict the flight route (g) while learning, by accumulating data of past flight routes (g) and predicting the flight route (g) using similar data obtained from the accumulated data. Furthermore, when accumulating the data of the past flight routes (g), the calculation unit 30 can also predict the flight route (g) while learning a tendency of each pilot, by accumulating data of the flight routes (g) of each pilot.

Furthermore, based on the prediction of the hazardous area (d) and the flight route (g), the calculation unit 30 selects an airplane (f) that will be present in the hazardous area (d) after a certain period of time, that is, an airplane (f) that is predicted to be affected by the weather phenomenon (c).

The creation unit 40 creates notification data (i) to be notified by the notification unit 20 based on the weather phenomenon (c), the position (c1), the hazardous area (d), the airplane (f), and the flight route (g) from the calculation unit 30. The creation unit 40 outputs the created notification data (i) to the notification unit 20 along with time (t) at which the weather information (a) is acquired, and stores the notification data (i) and the time (t) in the storage unit 41.

The notification unit 20 provides notification of the notification data (i) by, for example, displaying the notification data (i) on a display screen. Thus, the information on the airplane (f) affected by the weather phenomenon (c), the weather phenomenon (c), the hazardous area (d), etc. which are determined by the calculation unit 30 are notified, so that the controller can know the positional relationship between the airplane requiring attention, and the weather phenomenon (c) and the hazardous area (d) which affect such an airplane. Based on such knowledge, the controller also gains access to information on the airplane requiring attention. The notification unit 20 does not necessarily notify the notification data (i) based on the latest information, but may also acquire past notification data (i) stored in the storage unit 41 via the creation unit 40, and notify the acquired past notification data (i).

The operation unit 21 is connected to the notification unit 20 and includes input/output means such as a keyboard and a mouse (not shown). By using these input/output means, the controller can input, to the notification unit 20, operation information for specifying and changing the notification content notified from the notification unit 20.

Next, an example of the operation flow in the aviation weather control system 1 when torrential rain occurs, in the case where a phased array weather radar is applied to the weather radar 2, will be described.

First, a mechanism of occurrence of torrential rain and a method of predicting torrential rain will be described. Torrential rain can be predicted by observing the vertically integrated liquid (VIL) water content. The VIL water content is the amount of water present in a high place equal to or higher than 15 km up in the sky, and indicates the amount of water actually falling and the amount of water that may be going to fall. In the VIL water content, a portion in which water is concentrated is a heavy rain core, and this is a lump of raindrops causing torrential rain. By confirming an altitude and a moving state of the heavy rain core, it is possible to predict at which position and after how many minutes the torrential rain will occur.

For example, it is assumed that a portion with dense moisture is observed as it develops to grow in size and becomes rain to fall at a position between 6 km and 9 km into the sky. Since the rain at a height of 6 km will fall in about 10 minutes, it can be predicted that torrential rain occurs after about 10 minutes in the traveling direction of a rain cloud.

The weather radar 2 installed near the airport outputs weather information (a) of the area overseen by the weather radar 2, namely in this case, the VIL water content (a1) present in the area to be overseen, to the calculation unit 30 at regular time intervals. The calculation unit 30 receives the output weather information (a), that is, the VIL water content (a1), determines the heavy rain core (j) based on the VIL water content (a1), and specifies a weather phenomenon (c) that affects the airplane.

Next, the calculation unit 30 determines a hazardous area (d). The hazardous area (d) is a range in which a passing airplane is greatly affected by the weather phenomenon (c). An airplane present in the hazardous area (d) is likely to pass through the heavy rain core (j). An airplane which is scheduled to land and flying in the hazardous area (d) is highly likely to pass through the core (j) before landing. On the other hand, an airplane that flies in the hazardous area (d) after takeoff is highly likely to pass through the core (j) after takeoff.

At the same time, the calculation unit 30 receives the takeoff/landing information (e) of the airplane present in the area overseen by the airport from the air traffic control radar 3, and selects an airplane present in the hazardous area (d) as an airplane (f) affected by the weather phenomenon (c).

An example of the determination of the hazardous area (d) and the selection of the airplane (f) affected by the weather phenomenon (c) will be described with reference to FIG. 2A.

FIG. 2A shows an example of the relationship between the hazardous area (d) and the airplane (f) displayed on a display screen of the notification unit 20. FIG. 2A is a diagram in which the periphery of an airport 60 is viewed from directly above the airport 60, and shows a hazardous area (d) and a core (j) in addition to a runway 61 of the airport 60, a plurality of airplanes (f) (for example, f1, f2, and f3), and a cursor 26 displayed on the display screen of the notification unit 20.

In order to determine the hazardous area (d), the calculation unit 30 approximates the heavy rain core (j) to a spherical shape, as shown in FIG. 2A. Next, tangent lines (r1) and (r2) are drawn to the core (j) from the end 62 of the runway 61 on the side where the landing airplane (f1) takes off or lands. The area inside of the tangent lines (r1) and (r2) and within a certain distance from the airport 60 is defined as a hazardous area (d).

The calculation unit 30 further determines the position of the core (j) and the hazardous area (d) after a certain time based on the VIL water content (a1).

Furthermore, in the conventional case of storing past data related to the movement of the core (j) and determining the position of the core (j) and the hazardous area (d) after a certain period of time, the calculation unit 30 may refer to not only the VIL water content (a1) but also past similar data. The calculation unit 30 accumulates the data on the movement of the core (j) obtained by the above process for determination in in the future, thereby predicting the position of the core (j) and the hazardous area (d) after a certain period of time by learning.

Then, the calculation unit 30 acquires map information (b) of the area overseen by the airport 60 from the map information database 31, and outputs position data on the map information (b), the heavy rain core (j), the hazardous area (d), and the airplane (f) to the creation unit 40.

The creation unit 40 creates notification data (i) to be notified from the notification unit 20 based on each position data output from the calculation unit 30, and outputs the notification data (i) to the notification unit 20. For example, the creation unit 40 creates the notification data (i) by superimposing the heavy rain core (j), the hazardous area (d), and the airplane (f) on the corresponding positions on the map obtained from the map information (b).

At the same time, the creation unit 40 stores the notification data (i) in the storage unit 41 in association with time (t) when data is generated. The storage is performed every time the notification data (i) is updated. The storage unit 41 stores the notification data (i) in the storage unit 41 for at least a certain period of time in a state where the notification data (i) can be used by the calculation unit 30.

As a result, the calculation unit 30 narrows down the notification data (i) based on the past core size (for example, a core diameter) and the time information (for example, the past 5 years), and enables the creation unit 40 to acquire the past notification data (i) from the storage unit 41. Furthermore, it is also possible that the creation unit 40 acquires the notification data (i) after the certain period of time. The calculation unit 30 can also predict the weather phenomenon (c) after a certain period of time using the past notification data (i) acquired by the creation unit 40. The prediction of the weather phenomenon (c) after a certain period of time includes the above-described prediction of the future movement of the core (j).

The notification unit 20 notifies the notification data (i) created by the creation unit 40 by displaying the notification data (i) on a display screen, for example, and notifies the controller of information on the weather phenomenon (c), the hazardous area (d), the airplane, etc.

As illustrated in FIG. 2A, the hazardous area (d) is determined by the drawing of tangent lines (r1) and (r2) to the heavy rain core (j) from the end 62 of the runway 61 of the airport 60 on the side of the heavy rain core (j) The notification unit 20 highlights the airplane (f1) present in the hazardous area (d) by using a color different from those of the airplanes (f2) and (f3) present outside the hazardous area (d), or by blink indication. Alternatively, only the airplane (f1) present in the hazardous area (d) may be highlighted by blink indication, etc. This enables the controller to easily determine that it is necessary to pay attention to the airplane (f1) among the airplanes (f1), (f2), and (f3) notified from the notification unit 20.

Figure 2B:
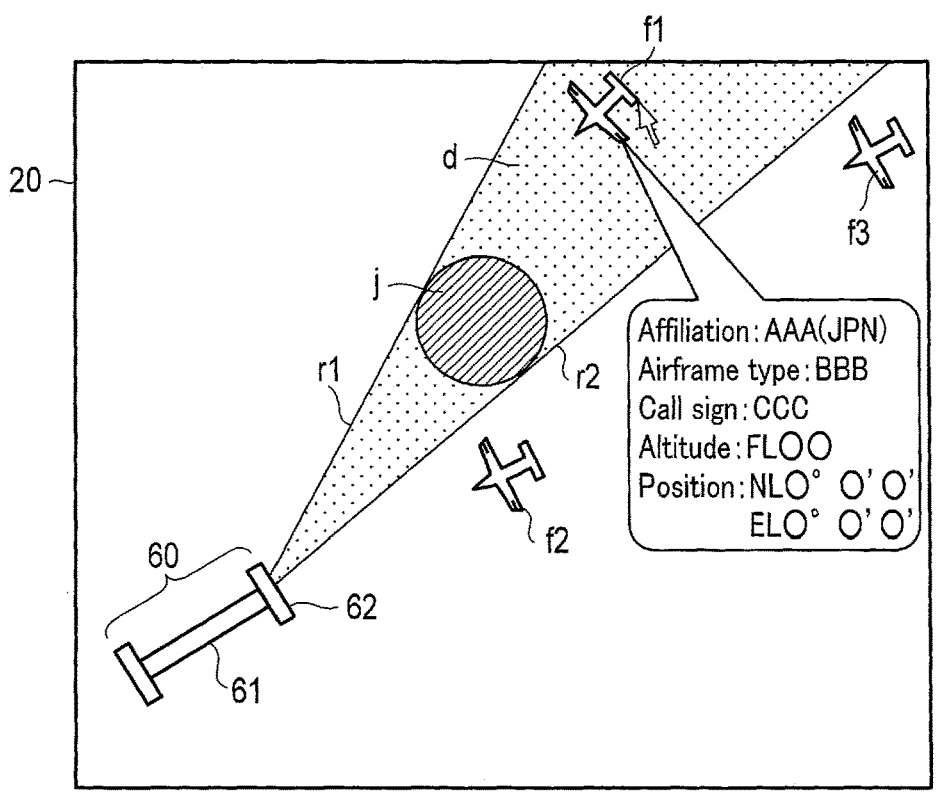
FIG. 2B is a diagram showing a notification example in which detailed information of an airplane is displayed in FIG. 2A.

When the airplane (f1) is specified by the cursor 26 by the operation of the controller, the notification unit 20 causes the display screen to display detailed information of the airplane (f1), such as an affiliation, an airframe type, a call sign, an altitude, and a position of the specified airplane (f1), as shown in FIG. 2B. Alternatively, the detailed information of the airplane (f1) present in the hazardous area (d) may be automatically displayed on the display screen without being specified by the operation of the controller.

Figure 3A:
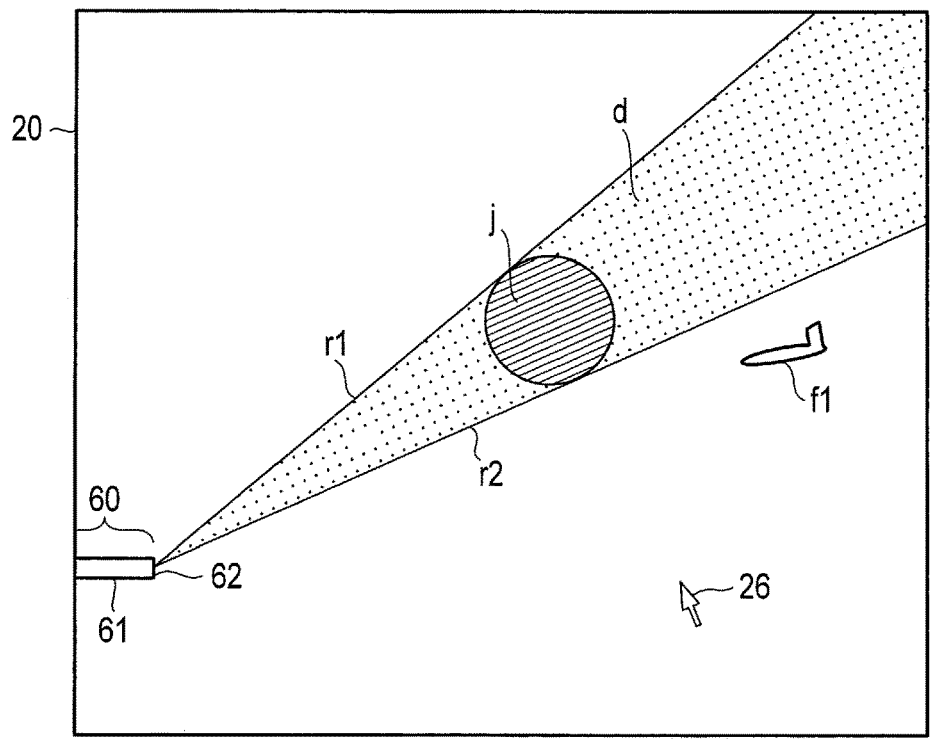
FIG. 3A is a diagram showing a notification example based on an elevation angle display by the aviation weather control system according to the embodiment.
Figure 3B:
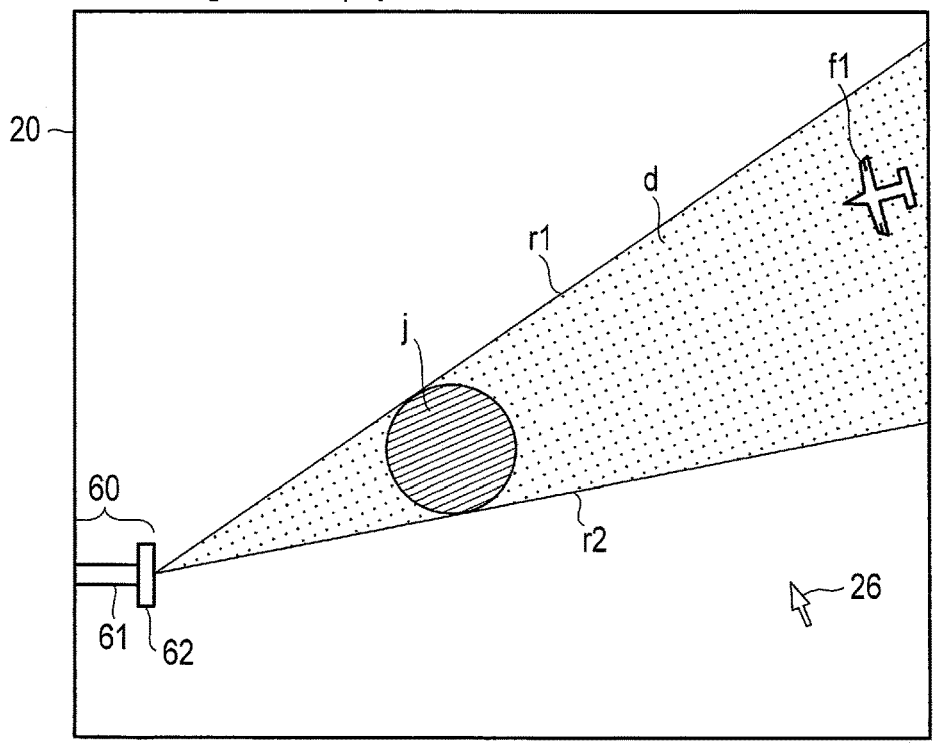
FIG. 3B is a diagram showing a notification example based on an azimuth angle display corresponding to FIG. 3A.

Further, as shown in FIGS. 3A and 3B, the positional relationship between the heavy rain core (j) and the airplane (f) can be clarified by using two types of display as viewed from two different directions.

FIG. 3A is elevation angle (EL) display, which is display in a case where the airport 60 and the heavy rain core (j) are viewed from the lateral direction.

FIG. 3B is azimuth angle (AZ) display, which is the display in a case where the vicinity of the airport is seen from above the airport 60.

According to the AZ display of FIG. 3B, the airplane (f1) appears to be present in the hazardous area (d); however, according to the EL display of FIG. 3A, it is found that the airplane (f1) is flying below the hazardous area (d).

By the display viewed from two directions, the controller can surely know whether or not the airplane (f) is present in the hazardous area (d). Therefore, the controller is freed from making unnecessary predictions and giving unnecessary considerations, and can concentrate on the airplane (f) requiring attention.

These two types of display may be performed on two display screens, or may be switched on a single display screen. In addition, the display is not limited to two directions, but may be from three or more directions as necessary.

Figures 4, 5:
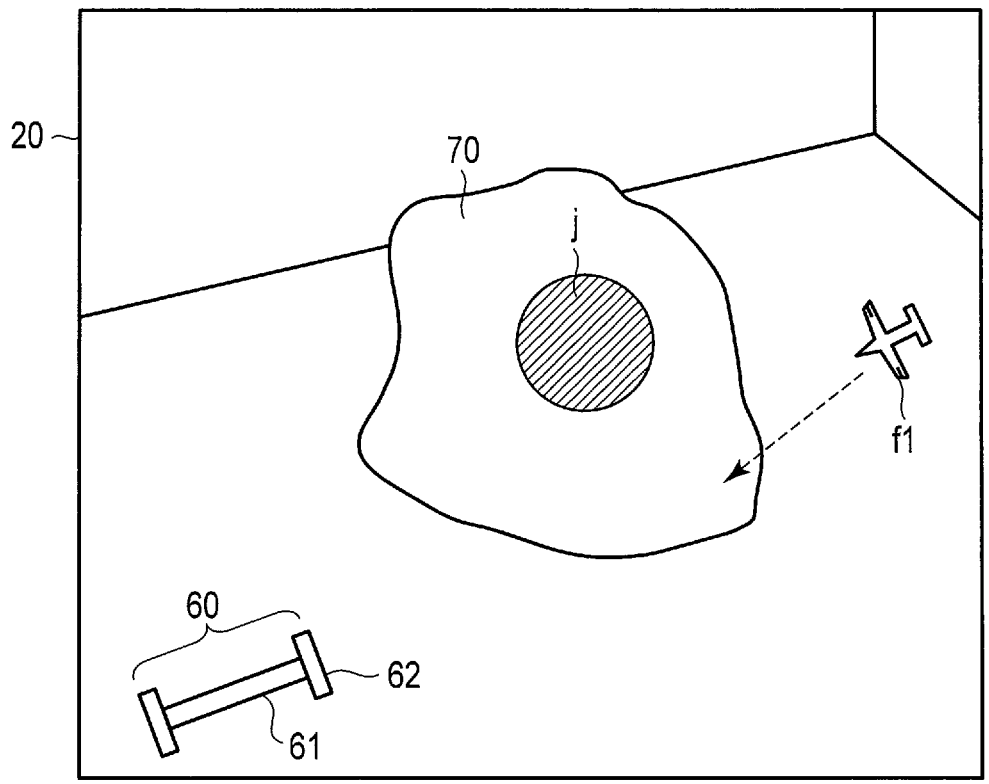
FIG. 4 is a diagram showing a notification example based on a 3D display by the aviation weather control system according to the embodiment.
FIG. 5 is a diagram showing an example of a table indicating a determination criterion defined by a core diameter for each airframe.

The positional relationship between the airplane (f) and the heavy rain core (j) can also be made clearer by a 3D display as in FIG. 4, instead of display from a plurality of directions. The dashed arrow in FIG. 4 indicates the traveling direction of the airplane (f1). FIG. 4 shows the airplane (f1) flying toward a cumulonimbus cloud 70 around the core (j). Thus, by knowing the detailed positional relationship between the airplane (f1) and the core (j), the controller can give more appropriate instructions.

A size of the weather phenomenon (c) that affects the airplane (f) is different depending on an airframe of the airplane (f). This is because the condition of the weather phenomenon (c) that affects the airplane (f) changes depending on an airframe conditions surrounding the airframe such as a size of the airframe, equipment, and a navigation speed. Accordingly, when predicting a weather phenomenon (c) that affects the airplane (f), it is preferable to provide a determination criterion for determining whether or not the weather phenomenon (c) affects the airplane (f) for each airframe. For example, when the criterion is defined by a diameter of the core (j), the value of the diameter of the core (j) that affects the airplane (f) is set for each airframe.

FIG. 5 is a diagram showing an example of a list (k) showing a criterion defined by a diameter of the core (j) for each airframe.

The list (k) includes a scheduled takeoff time (k1), a scheduled landing time (k2), an airframe type (k3), and a core size (core diameter) (k4). In the list (k) exemplified in FIG. 5, the core size (core diameter) (k4) corresponds to the determination criterion. The core size (core diameter) (k4) corresponds to a diameter of the core (j) of the heavy rain that affects the airframe, and differs depending on the airframe type (k3).

Since the list (k) lists the determination criterion for each airplane according to the takeoff/landing time schedule, it is possible to determine whether or not the diameter of the core (j) affects each airframe, in the order of the airplanes (f) that are going to fly.

For example, in the case of an airplane of which the scheduled takeoff time (k1) is "13:10" and the airframe type (k3) is "A," the core size (core diameter) (k4) is described as "Equal to or greater than 3 km" and the airplane is affected by a heavy rain core (j) having a diameter equal to or greater than 3 km.

Similarly, in the case of an airplane of which the scheduled takeoff time (k1) is "13:16" and the airframe type is "B," the core size (core diameter) (k4) is described as "Equal to or greater than 4 km" and the airplane is affected by a heavy rain core (j) having a diameter equal to or greater than 4 km.

In the case of an airplane of which the scheduled landing time (k2) is "13:25" and the airframe type is "C," the core size (core diameter) (k4) is described as "Equal to or greater than 2 km" and the airplane is affected by a heavy rain core (j) having a diameter equal to or greater than 2 km.

Therefore, for example, if the diameter of the observed heavy rain core (j) is 3 km, the detection unit 20 notifies, as an object requiring attention, the airplane of which airframe type (k3) is "A" or "C" and which is present in the hazardous area (d). On the other hand, the airplane having the airframe type (k3) of "B" is not notified, because the core size (core diameter) (k4) is equal to or greater than 4 km and is not an object requiring attention.

On the other hand, if the diameter of the observed heavy rain core (j) is 5 km, an airplane of any of the airframe types (k3) "A," "B," and "C" is affected by heavy rain, and therefore, the notification unit 20 notifies, as the airframe requiring attention, all airplane of which the airframe type (k3) is any of "A," "B," and "C" and which exist in the hazardous area (d).

The configuration of the list (k) is not limited to those shown in FIG. 5. For example, the detailed time information such as the scheduled takeoff time (k1) and the scheduled landing time (k2) may be appropriately modified to a configuration easily usable by the controller such as takeoff/landing information at regular time intervals, etc.

The list (k) is optimally held by the calculation unit 30. When selecting an airplane (f) affected by the weather phenomenon (c), the calculation unit 30 can select the airplane (f) for each airframe in the order of takeoff/landing by using such a list (k).

If the calculation unit 30 can predict another weather phenomenon (c') such as a downburst or a shear line from the weather information (a) received from the weather radar 2, the weather phenomenon (c) to be determined is not limited to the heavy rain core (j), and may be set to a determination criterion regarding a size of the other weather phenomenon (c'). By setting a plurality of determination criteria in such a manner, more accurate and detailed determination results can be obtained.

In addition, the notification unit 20 can display an airframe requiring special attention on the display screen while changing a background color or colored characters. For example, the airframe, of which the airframe type (k3) is "C" in the list (k) exemplified in FIG. 5, has a core size (core diameter) (k4) is "Equal to or more than 2 km," and may be more easily affected by the heavy rain core (j) than other airframes of which the airframe types (k3) are "A" and "B." In such a case, the notification unit 20 displays airplanes in different colors based on their airframe types (k3); for example, the airplane of the airframe type (k3) of "C," which is most easily affected by the heavy rain core (j), in red, and the airplane of the airframe type (k3) of "B," which is the next most easily affected by the heavy rain core (j), in yellow. This enables the controller to visually and easily know the airframe requiring attention, thus reducing the burden of work on the controller.

Further, as exemplified in FIG. 6A, by displaying time information (T) on the display screen of the notification unit 20, it is possible to notify the controller of the time of the situation of the notification data (i) displayed on the display screen. In addition, as exemplified in FIG. 6B in addition to FIG. 6A, by also displaying predicted notification data (i) after a certain period of time, the controller can know the predicted future growth and movement of the core (j) and the traveling state of the airplane 25.

In FIG. 6A, the current notification data (i) at the current time "10:55:00" is displayed together with the time information T. On the other hand, in FIG. 6B, notification data iexp based on the prediction result of the situation after 5 minutes is displayed together with time information T indicating "11:00:00" which is the time after 5 minutes.

In order to distinguish the current notification data (i) exemplified in FIG. 6A from the predicted notification data iexp exemplified in FIG. GB, the background color may be changed between the display screen for displaying the current notification data (i) and the display screen for displaying the predicted notification data iexp.

The current notification data (i) and the predicted notification data iexp may be switched and displayed on one display screen.

As a modified example, in response to an instruction from the calculation unit 30, the creation unit 40 may acquire notification data ipast five minutes after the past notification data similar to the current notification data (i) from the storage unit 41, and output the notification data ipast to the notification unit 20, so that the notification unit 20 may display the notification data iexp and the notification data ipast on one display screen in a superimposed manner. Alternatively, the notification data iexp and the notification data ipast may be switched and displayed on one display screen.

The aviation weather control system 1 is not particularly required to be installed in the vicinity of the airport 60 as long as the controller can give an accurate instruction to the pilot. The weather radar 2 is not necessarily a phased array weather radar, and may be a weather radar other than the phased array weather radar as long as it can provide necessary weather information (a) to the calculation unit 30.

As described above, according to the aviation weather control system 1 of the embodiment, it is possible to determine a hazardous area (d) based on the weather information (a) and the position of the airport 60, specify an airplane (f) requiring attention based on takeoff/landing information of the airplane (f) located around the airport 60, and display positions of the airplane (f) and the hazardous area (d) on the map obtained from map information (b) around the airport 60 in an superimposed manner.

Based on this display, the controller can easily know which airplane (f) is an airplane (f) easily affected by a weather phenomenon (c) and to which attention should be paid.

As a result, the burden on the controller is reduced, so that the controller can immediately know the airplane (f) requiring attention even in a situation where multiple matters should be determined instantly.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the inventions.

The invention claimed is:

1. An aviation weather control system comprising:
   a processing unit configured to receive weather information of an area to be overseen including a vertically integrated liquid water content, and specify a weather phenomenon affecting an airplane based on the received weather information; and
   a notification unit configured to notify the weather phenomenon specified by the processing unit,
   the processing unit including:
      means for determining a range affecting the airplane as a hazardous area if the weather phenomenon is specified, and for predicting the weather phenomenon affecting the airplane based on a positional relationship between the hazardous area when the weather information is obtained and the airplane;
      means for storing map information of the area to be overseen;
      means for determining a heavy rain core based on the vertically integrated liquid water content, approximating the determined core to a spherical shape, and determining, as the hazardous area, a range which is inside tangent lines drawn to the core from an end of a runway on a side where the airplane either takes off or lands and within a certain distance from an airport provided with the runway; and
      means for selecting an airplane predicted to be affected by the weather phenomenon based on the determined hazardous area and previously stored airplane takeoff/landing information of airplanes, the takeoff/landing information including any one of a position of the airplane, an altitude of the airplane, or a call sign for specifying the airplane, and
   the notification unit notifying the hazardous area determined by the processing unit.

2. The aviation weather control system according to claim 1, wherein the notification unit includes means for notifying the airplane flying in the hazardous area in a different manner from airplane flying outside the hazardous area.

3. The aviation weather control system according to claim 1, wherein the processing unit includes means for predicting the weather phenomenon and the hazardous area based on current and past versions of the weather information.

4. The aviation weather control system according to claim 3, wherein the processing unit includes means for predicting a future flight route of an airplane based on flight plan information of the airplane.

5. The aviation weather control system according to claim 4, wherein the means for selecting an airplane predicted to be affected by the weather phenomenon selects the airplane predicted to be affected by the weather phenomenon further based on the flight route.

6. The aviation weather control system according to claim 5, wherein the notification unit displays the selected airplane.

7. The aviation weather control system according to claim 1, wherein the notification unit displays the selected airplane.

8. The aviation weather control system according to claim 1, wherein the notification unit notifies at least one of the predicted weather phenomenon or the selected airplane, along with time.

9. An aviation weather control system comprising:
   a processing unit including means for receiving weather information of an area to be overseen, specifying a weather phenomenon in the area to be overseen, determining a range affecting an airplane as a hazardous area based on the specified weather phenomenon, and selecting an airplane affected by the weather phenomenon based on the hazardous area and takeoff/landing information of the airplane, the takeoff/landing information including any one of a position of the airplane, an altitude of the airplane, or a call sign for specifying the airplane; and
   a notification unit configured to notify the selected airplane,
   the processing unit including means for storing a type or a size of a weather phenomenon affecting an airplane for respective airframe types of airplanes in advance, and determining whether or not to notify the selected airplane for the respective airframe types of the airplanes based on the stored type or size.

10. The aviation weather control system according claim 9, wherein the takeoff/landing information further includes information on a takeoff/landing order of airplanes.

11. The aviation weather control system according to claim 9, wherein
   the takeoff/landing information further includes schedule information of takeoff/landing of airplanes, and
   the processing unit includes means for selecting an airplane affected by the weather phenomenon based on a period of time in which an airplane is affected by the weather phenomenon and the schedule information.

12. The aviation weather control system according to claim 9, wherein the system stores notification data notified by the notification unit each time the notification data is updated.

13. The aviation weather control system according to claim 9, wherein the notification unit displays the positional relationship between the weather phenomenon and the airport, where the selected airplane takes off or lands, from at least one direction selected from a plurality of directions.

14. The aviation weather control system according to claim 1, wherein the processing unit includes means for specifying a heavy rain core as the weather phenomenon, and predicting a future movement of the core.

15. The aviation weather control system according to claim 9, wherein the processing unit includes means for specifying a heavy rain core as the weather phenomenon, and predicting a future movement of the core.

* * * * *